Sept. 1, 1964 D. J. BLATTNER 3,147,435

STRIP LINE PHASE COMPARATOR

Filed March 27, 1962 2 Sheets-Sheet 1

INVENTOR

DONALD J. BLATTNER

BY

B. L. Zangwill

ATTORNEY

Sept. 1, 1964 D. J. BLATTNER 3,147,435

STRIP LINE PHASE COMPARATOR

Filed March 27, 1962 2 Sheets-Sheet 2

INVENTOR

DONALD J. BLATTNER

BY

B. L. Zangwill

ATTORNEY 3,147,435

STRIP LINE PHASE COMPARATOR

Donald J. Blattner, Princeton, N.J., assignor, by mesne assignments, to the United States of America as represented by the Secretary of the Navy Filed Mar. 27, 1962, Ser. No. 182,987
10 Claims. (Cl. 324—83)

This invention relates to phase comparators and, more particularly, it relates to a phase comparator that provides a high output voltage when two input signals have the same phase and a low output voltage when the two signals are of a different phase.

In a digital information handling system, a binary "one" can be represented by a radio frequency signal of a given phase, and a binary "zero" by a radio frequency signal of the opposite phase. In such a system the frequency and amplitude of the signals remain substantially constant. Phase comparators are essential components of such digital information systems. This is true because the two phases, which are used to indicate the binary information, are frequently distinguished by comparison with a reference signal of a fixed phase.

In the prior art the phases of signals from subharmonic oscillators were compared by means of transformers or by means of vacuum tube mixers. These devices provide one signal when the oscillators are in phase and another signal when out of phase. For example, if a transformer is used for the phase comparator and the oscillators are connected to the two opposite ends of the primary coil, there will be no output when the oscillators are in phase and a strong output when they are 180 degrees out of phase. However, these comparators are bulky and not suitable for use with the strip line oscillators that are used in many computor applications.

The object of the present invention is to provide a phase comparator for two radio frequency signals.

More specifically, an object of this invention is to provide a phase comparator for use in information handling systems to compare the phases of oscillation of two strip-line phase-locked oscillators.

Other objects and many of the attendant advantages of this invention will be readily appreciated as the same become better understood by reference to the following detailed description when considered in connection with the accompanying drawings wherein.

The comparator and oscillators are composed of copper strips that are plated on a dielectric shown at 10. This dielectric may be composed of a "Teflon" and glass fiber composition. It separates the strips of copper from the copper ground plate 12.

Figure 1:
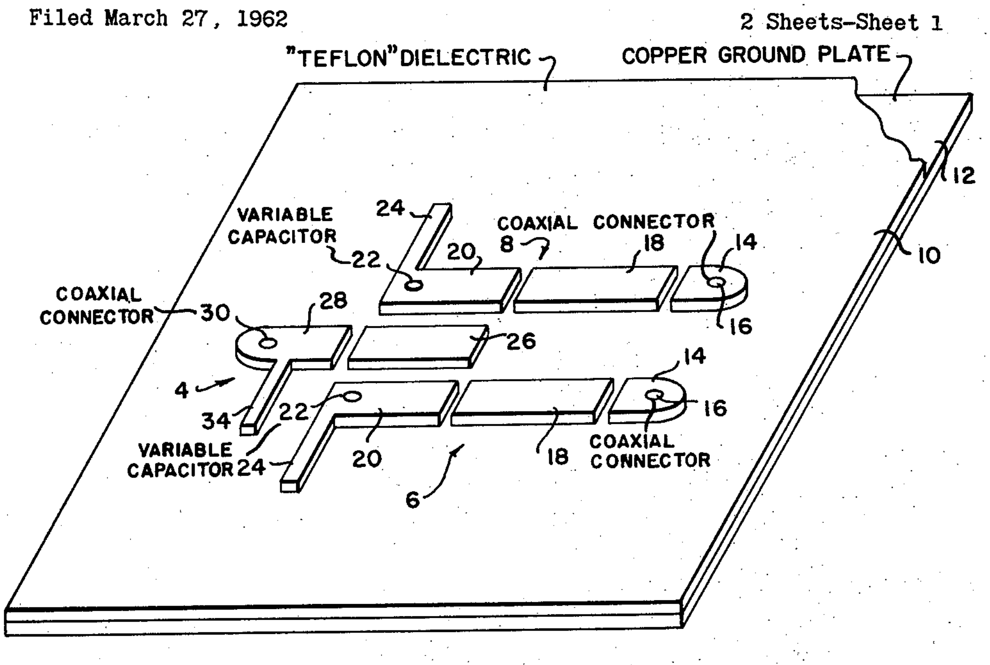
FIG. 1 is a prospective view of one embodiment of this invention with a partial breakout, and showing the phase comparator combined with two strip line subharmonic oscillators.

Both of the subharmonic oscillators 6 and 8 as shown in FIG. 1 are identical. They are comprised of a pump input-power terminal 14 containing a coaxial connector 16. This pump input terminal is capacitively coupled to a resonant copper strip 18, which is tuned to the pump input frequency. A copper strip tank circuit 20 is capacitively coupled to the resonant copper strip and tuned to a subharmonic frequency, which may be one half of the pump input frequency. This copper strip tank circuit has a crystal diode 22 mounted on its reverse side and a filter across it. This filter consists of a shorted stub 24, which is a half wave length long at the pump frequency.

In this preferred embodiment the pump frequency will be 4000 megacycles. The resonant copper strip 18 is one-half the wave length of this pump frequency long and, therefore, will pass this frequency to the resonator 20, but will prevent the 2000 megacycle oscillation power from escaping. The copper strip tank circuit 20 is one-quarter wave length of the output subharmonic frequency of 2000 megacycles.

The crystal diode 22 acts as a variable capacitance which is excited by the pump power so as to create a negative resistance which causes the copper strip tank circuit 20 to oscillate at one half the frequency of the pump power. A more detailed description of this phenomenon may be found in U.S. Patent No. 2,815,488, issued on December 3, 1957, to Von Neumann and entitled, "Non-linear Capacitance or Inductance Switching, Amplifying, and Memory Organs."

A phase comparator of this invention is shown situated between the two subharmonic oscillators 6 and 8 in FIG. 1. It is comprised of a copper strip pick up line 26 with the copper strip output line 28. The copper strip pick up line 26 is also made resonant at 2000 megacycles and is lightly coupled to the copper strip tank circuits 20 of the two subharmonic oscillators. The coupling between either oscillator circuit and copper strip pick up line will be approximately a negative 10 decibels, so that the coupling between the two oscillators themselves will be too small for them to lock one another. The copper strip output line 28 is capacitively coupled to the copper strip pick up line 26 and contains a coaxial connector 30 and a filter 34 which is a shorted stub one-half wave length long at 4000 megacycles.

Figure 2:
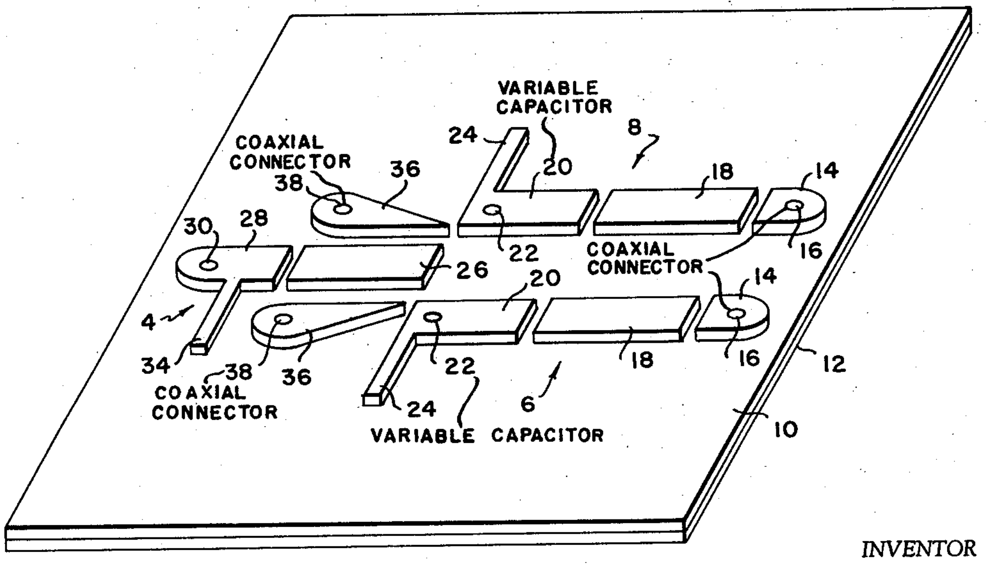
FIG. 2 is a prospective view of another embodiment of this invention showing the phase comparator combined with two subharmonic oscillators as used in a phase script information handling system.

The embodiment of FIG. 2 is similar to that of FIG. 1 but is adapted to handle phase scrip information. It is comprised of copper ground plate 12, "Teflon" dielectric 10, strip line subharmonic oscillators 6 and 8, and phase comparator 4. Each subharmonic oscillator consists of pump frequency input terminal 14, resonant copper strip 18, copper strip tank circuit 20, filter 24, and variable capacitance 22. The phase comparator consists of copper strip pick up line 26 and copper strip output line 28. Each subharmonic oscillator also has an output arm 36 containing a coaxial connector 38.

The phase comparator of this invention has general application for comparing the phases of strip line oscillators. However, its operation will be discussed with respect to its primary application at this time: that of reading out phase strip information.

A binary code is frequently used to convey information in computors and general information handling systems. Two forms of such a binary code are illustrated by the wave forms in FIG. 4.

Figures 4, 5, 6:
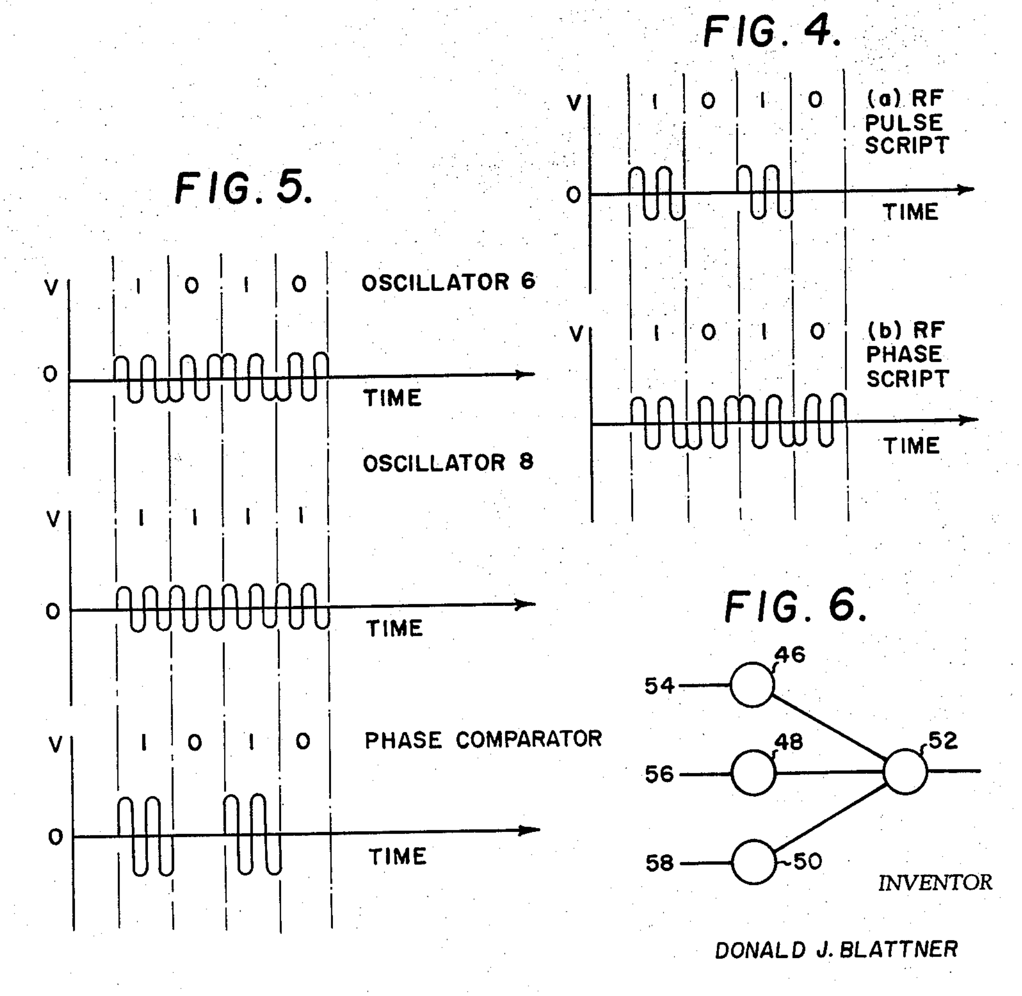
FIG. 4 is a graphic comparison of the voltage characteristics used in pulse script information handling systems and phase script information handling systems.
FIG. 5 is a graph of the outputs of two subharmonic oscillators, carrying phase script information and the resulting output from the phase comparator that couples them.
FIG. 6 is a diagrammatic view of four subharmonic oscillators connected so as to perform majority decision logic operations.

FIG. 4(*a*) illustrates radio frequency pulse script binary code. In this code the presence of a radio frequency signal is taken to indicate a binary "1", and the absence of such radio frequency signal indicates a binary "0." Combinations of binary "1" and "0" indicate information-conveying characters. FIG. 4(*b*) illustrates radio frequency phase script code. In this code a radio frequency signal of one phase indicates a binary "1" and a radio frequency signal 180 degrees out of phase with this first signal indicates a binary "0." Combinations of these binary "1"s and binary "0"s form information conveying characters. These two types of binary codes are illustrated one under the other for the purposes of comparison in FIG. 4.

Subharmonic oscillators 6 and 8 as shown in FIGS. 1 and 2 are frequently used to generate the binary code which is used in phase script information handling systems. In the subharmonic oscillator 8 a pump frequency of 4000 megacycles is applied to the coaxial connector 16 in the pump power-input terminal 14. The resonant copper strip 18 is open and one-half wave length of this 4000 megacycle pump frequency long and, therefore, it will pass this frequency power to the copper strip tank circuit 20. The wave form of this frequency is shown as curve 40 in FIG. 3.

With the variable capacitance mounted near the shorted end of the copper strip tank circuit 20, this tank will resonate at 2,000 megacycles, which is one-half the frequency of the pump power. This copper strip tank circuit has a length equal to one-quarter the wave length of 2000 megacycles. The crystal diode 22 is excited by the pump power current and operates as a variable capacitor. The transmission line equation for this system reduces to essentially the equivalent of a lump parameter system with a simple inductance and conductance across a variable capacitor. This is more fully explained in the article by Hilibrand, J., and Beam, W. R., entitled "Semiconductor Diodes and Parametric Subharmonic Oscillator," RCA Review, Volume 20, No. 2; June 19, 1959, pages 229 thru 253.

The output of the subharmonic oscillator may take either of two phases. The two possibilities are shown as curves 42 and 44 in FIG. 3. The two phases are 180° out of phase with respect to each other. As will be explained later, the control and monitoring of this phase is of use in information handling systems of the phase script type.

One way to determine the phase of the output frequency of such a harmonic oscillator is to compare it to a known oscillation. For example, in FIG. 1, if the phase of oscillation of subharmonic oscillator 8 is known, the phase of oscillation of the output of oscillator 6 may be determined from the output of the comparator which can be picked up at the connector 30. If the two phases are 180° out of phase they will cancel in the copper strip pickup line 26 of comparator 4; and will result in a very weak signal at connector 30. If the output from the two subharmonic oscillators 6 and 8 have the same phase they will be added in the copper strip pickup line and will result in a strong output signal at connector 30 of comparator 4. Therefore, the output from the comparator at connector 30 will indicate whether or not the unknown oscillation from subharmonic oscillators 6 has the same phase or the opposite phase from that from the standard signal from subharmonic oscillator 8.

Figure 3:
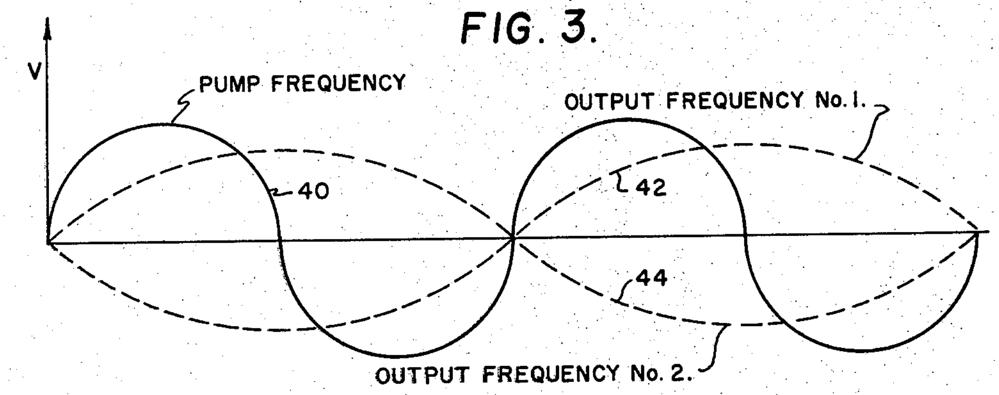
FIG. 3 is a graph of the voltage characteristics of a subharmonic oscillator with the pump frequency and the two possible phases of output frequency indicated.

The phase in which the oscillator operates is determined by the conditions in the oscillator at the instant the driving frequency is applied. Either of the two phases shown in FIG. 3 are possible because they bear the same relation to the pump frequency. If noise alone is present at the threshhold value of pump frequency which will start the oscillations in the output copper strip tank circuit, then either phase is equally probable. If, however, a sufficiently strong locking signal at the subharmonic frequency is present in the tank during the time that oscillations are starting to build up, then oscillations will start in the phase closest to the phase of this initial signal.

In the embodiment of FIG. 2 an output arm 36 is lightly coupled to the copper strip tank circuit of the subharmonic oscillator. An exciting frequency of 2000 megacycles may be applied to connector 38. This exciting signal will determine the output phase of the subharmonic oscillator.

The subharmonic oscillators such as 6 and 8 may be used to perform many logical operations in computers. For example, if the subharmonic oscillators of the type shown in FIG. 2 are represented by a circle as shown in FIG. 6 they may be combined to perform such logical operations.

In FIG. 6, 46, 48, 50 and 52 each represent a subharmonic oscillator of the type shown in FIG. 2. Oscillators 46, 48 and 50 are coupled to the input of oscillator 52 such that there is a coupling constant K coupling them to connector 38 as an exciting frequency. It can be seen that if two of the subharmonic oscillators 46, 48 and 50 are operating in one phase and one in the opposite phase the subharmonic oscillator 52 will be locked into the same phase as the two subharmonic oscillators 46, 48 and 50 that are in phase. This is the so-called majority decision logic operation. If one of the subharmonic oscillators such as 50 is always operating in a "1" state, it can be seen that the circuit of FIG. 6 will be an "OR" gate. That is, if either or both of the two subharmonic oscillators 46 and 48 are operating in the "1" state, the output from oscillator 52 will be a "1," but if both of the oscillators 46 and 48 are operating in the "0" state, the output will be "0." Other such logic circuits can be found in the article by S. Muroga, published in Datamation Magazines, entitled "Elementary Principles of the Paramatron," September-October 1958, pages 31 thru 34.

The comparator of this invention may be used to determine the phase of the final oscillator for read-out purposes. In the phase script handling system an oscillation of standard phase is used throughout. The phase of the output is compared to this standard phase to determine if it is binary "1" or a "0". For example, in FIG. 5, the comparison of two wave forms is shown. In FIG. 5, the wave form labeled oscillator 8 is the standard wave form. The wave form from oscillator 6 is shown as having the states "1," "0," "1" and "0". It can be seen that the output from the phase comparator will indicate the binary "1" state in oscillator 6. This output is in the form of radio frequency pulse scrip and can be converted to D.C. pulse script in a detector circuit.

Obviously, many modifications and variations of the present invention are possible in the light of the above teachings. It is, therefore, to be understood that within the scope of the appended claims the invention may be practiced otherwise than as specifically described.

What is claimed is:

1. A phase comparator comprising:
(*a*) a resonant strip line;
(*b*) means for coupling a first signal to said resonant strip line through fringing fields of the strips;
(*c*) means for coupling a second signal to said resonant strip line through fringing fields of the strips; and
(*d*) an output line coupled to said resonant strip line, such that it will receive a strong signal when said first and second signals are in phase and a weak signal when they are out of phase.

2. A phase comparator according to claim 1, in which said first-signal coupling means and said second-signal coupling means are placed in juxtaposition with said resonant strip line so as to couple their signals to the same location in said resonant strip line.

3. A phase comparator according to claim 2, in which said output line includes a filter to discriminate against unwanted signals.

4. A phase comparator for use in comparing the phases of oscillation of two strip line subharmonic oscillators comprising:
(*a*) a common line coupled to both oscillators;
(*b*) said common line including a pickup line coupled to both oscillators through their fringing fields; and
(*c*) an output line capacitively coupled to said pickup line whereby a strong output voltage is obtained when said oscillators are in phase and a weak output voltage is obtained when said oscillators are not in phase.

5. A phase comparator for use in comparing the phases of oscillation of two strip line subharmonic oscillators, according to claim 4, in which the coupling between each oscillator circuit and said pickup line is −10 decibels so as to prevent coupling between the oscillators that is strong enough to cause them to lock one another.

6. A phase comparator for use in comparing the phase of oscillation of two strip line subharmonic oscillators, according to claim 4, and further, including a filter across said output line.

7. A phase comparator for use in comparing the phase of oscillation of two strip line subharmonic oscillators, according to claim 6, in which said pickup line resonates at the output frequency of said subharmonic oscillators.

8. A phase comparator for use in comparing the phase of oscillation of two strip line subharmonic oscillators, according to claim 7, in which said filter consists of a shorted stub that is one-half wave length long at the pump frequency of said subharmonic oscillators.

9. A phase comparator for use in comparing the phase of oscillation of two strip line subharmonic oscillators, according to claim 8, in which said pump frequency is 4000 megacycles.

10. A phase comparator for use in comparing the phase of oscillation of two strip line subharmonic oscillators, according to claim 9, in which said output frequency is 2000 megacycles.

References Cited in the file of this patent

UNITED STATES PATENTS 2,734,168 Zachary et al. ............ Feb. 7, 1956